(12) United States Patent
Nakashima

(10) Patent No.: US 7,011,208 B2
(45) Date of Patent: Mar. 14, 2006

(54) CONVEYING MECHANISM

(75) Inventor: Atsuhisa Nakashima, Handa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/493,942

(22) PCT Filed: Mar. 7, 2003

(86) PCT No.: PCT/JP03/02760

§ 371 (c)(1),
(2), (4) Date: Apr. 27, 2004

(87) PCT Pub. No.: WO03/076318

PCT Pub. Date: Sep. 18, 2003

(65) Prior Publication Data

US 2004/0201160 A1 Oct. 14, 2004

(30) Foreign Application Priority Data

Mar. 11, 2002 (JP) ............................. 2002-065901

(51) Int. Cl.
B65G 15/60 (2006.01)
(52) U.S. Cl. ..................................... 198/840; 198/841
(58) Field of Classification Search ................ 198/837, 198/840, 841, 810.03, 807
See application file for complete search history.

(56) References Cited

U.S. PATENT DOCUMENTS 3,807,246 A * 4/1974 McIllwain ................... 198/835
4,225,036 A * 9/1980 Michael ....................... 198/840
4,249,653 A * 2/1981 Kufferath-Kassner ....... 198/848
5,017,969 A * 5/1991 Mitomi et al. .............. 198/835
5,626,337 A * 5/1997 Iseki .......................... 198/840

FOREIGN PATENT DOCUMENTS

| JP | U 2-119444 | 9/1990 |
| JP | U 3-116332 | 12/1991 |
| JP | A 5-319611 | 12/1993 |
| JP | B2 2541002 | 7/1996 |
| JP | A 8-225180 | 9/1996 |
| JP | A 9-114266 | 5/1997 |
| JP | A 9-169445 | 6/1997 |
| JP | A 9-281815 | 10/1997 |
| JP | A 11-157691 | 6/1999 |
| JP | A 11-265124 | 9/1999 |
| JP | A 11-310348 | 11/1999 |
| JP | A 11-349171 | 12/1999 |
| JP | A 2000-347381 | 12/2000 |
| JP | A 2001-80782 | 3/2001 |

* cited by examiner

Primary Examiner—James R. Bidwell
(74) Attorney, Agent, or Firm—Oliff & Berridge, PLC

(57) ABSTRACT

A conveying mechanism capable of preferably inhibiting the portion of a transfer belt located in an image forming area from meandering. A plurality of ribs (84) are provided so as to extend approximately parallel to a transfer direction (X) on an upper surface (8a) of a guide member (8). The intervals between the ribs (84) are constituted to be gradually narrowed in the left direction (Y). A transfer belt (3) is gradually moved in the left direction (Y) by the abutment between an inner side face (3d) thereof and the plurality of ribs (84). The movement of the transfer belt (3) in the left direction (Y) is limited and restricted by the abutment between a right side face (81a) of a projection piece (81) of the guide member (8) and a left side face (3b) of the transfer belt (3).

14 Claims, 10 Drawing Sheets

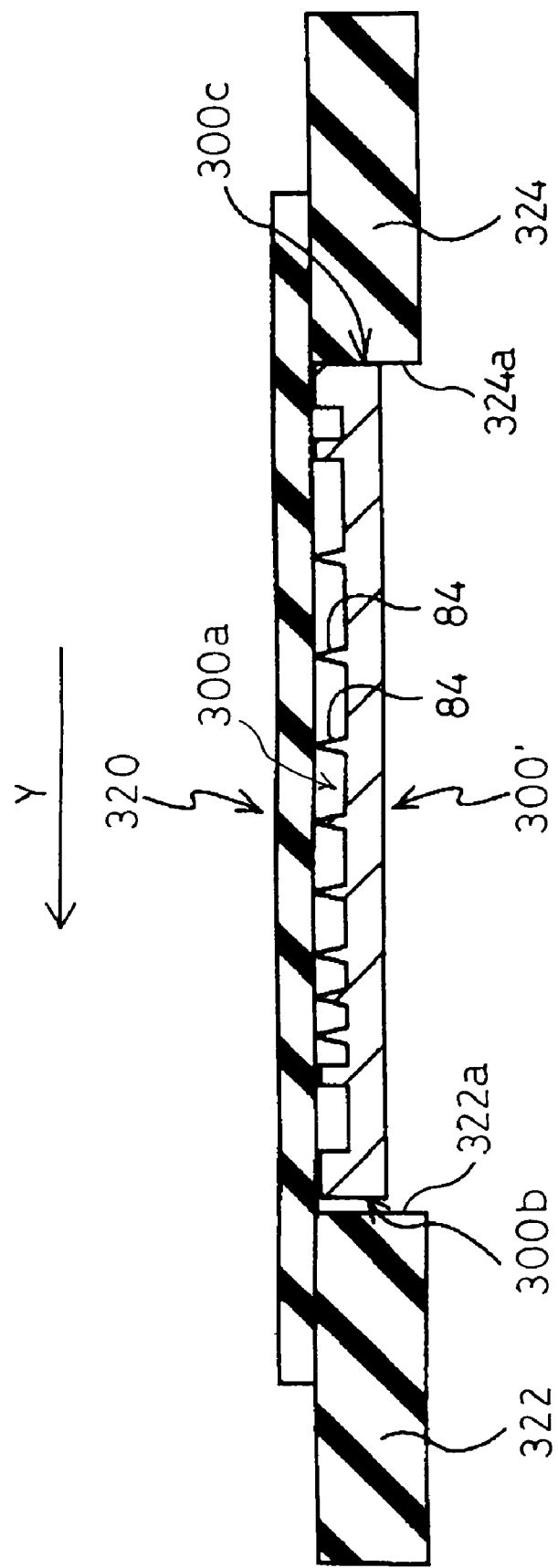

CONVEYING MECHANISM

TECHNICAL FIELD

The present invention relates to a conveying mechanism and more specifically, to a conveying mechanism which inhibits positional deviation of a transfer belt in its width direction when the transfer belt wound around transfer rollers is transferred.

BACKGROUND ART

Image forming apparatuses, for recording images on recording mediums such as paper or the like, for example, inkjet printers with inkjet heads (corresponding to recording heads), have been conventionally known. In the inkjet printer, the image is formed (printed) on the recording medium, e.g. paper or the like, which is placed on a transfer belt wound around at least two transfer rollers, in an image forming area. The transfer rollers are driven by a driving roller, and the transfer belt is moved cyclically by the transfer rollers. Subsequently, the recording medium, e.g. paper or the like, which is placed on the transfer belt, is transferred to the image forming area facing the inkjet head, and the image is formed on the recording medium. The recording medium is discharged thereafter.

In the case of such image forming apparatus provided with a conveying mechanism that comprises the aforementioned transfer belt and transfer rollers, for example, the parallelism of rotational axes of the transfer rollers or the external diameters thereof may vary during the manufacture. As a result, the transfer belt may meander and be positionally deviated in the width direction when the transfer belt is being transferred.

If the transfer belt is positionally deviated in this manner, such problems occur that the recording medium transferred by the transfer belt is positionally deviated, and that the image forming position on the recording medium is also positionally deviated.

Heretofore, the configuration as described below in the Patent Document 1 has been known. In the configuration, a detective device for detecting the displacement of the transfer belt in the width direction is provided, and one of the transfer rollers wound around by the transfer belt is axially displaced based on detective signals from the detective device, thereby inhibiting the positional deviation of the transfer belt. In this configuration, the positional deviation is suppressed in the portion of the transfer belt which is engaged with the axially displaced transfer roller.

Moreover, the configuration as described below in the Patent Document 2 has been known. In the configuration, a circular engaging plate is attached to a rotational axis of each transfer roller, while a rib engaged with the engaging plate is provided on the inner surface of the transfer belt. In this configuration, the engaging plate and the rib are engaged with each other, thus inhibiting the positional deviation of the transfer belt in the engaging area between the transfer rollers and the transfer belt (more specifically, the engaging area between the supporting plate and the rib).

[Patent Document 1]
Specification of Japanese Patent 2541002

[Patent Document 2]
Publication of Unexamined Japanese Patent Application 11-265124

However, the configurations as described in the above patent documents are aimed at inhibiting the meandering of the transfer belt only in the engaging area between the transfer rollers and the transfer belt, so that meandering of the transfer belt within the image forming area is not always preferably avoided.

In other words for example, if the transfer belt is supported by the transfer rollers only at upstream and downstream locations of the belt, across the image forming area, meandering of the transfer belt is suppressed in the portion of the transfer belt wound around the transfer rollers. However, in the portion of the transfer belt located in the image forming area, the transfer belt often continues to cause the positional deviation by meandering.

If the portion of the transfer belt located in the image forming area continues meandering in this manner and subsequently the positional deviation of the transfer belt in the width direction occurs, the positional deviation of the recording medium fed to the image forming area occurs, and thus the positional deviation of the image forming position occurs.

DISCLOSURE OF INVENTION

An object of the present invention is to overcome the above described shortcomings of the prior art and to provide a conveying mechanism capable of preferably avoiding the meandering of the portion of a transfer belt located in an image forming area.

To attain the above and other objects, the conveying mechanism of the present invention transfers a recording medium to an image forming area in which an image is formed on the fed recording medium. The mechanism also comprises a transfer belt for transferring the recording medium at the position with a predetermined interval with respect to a recording head for forming the image, and at least two transfer rollers for transferring the transfer belt wound around the transfer rollers.

Also, the conveying mechanism of the present invention comprises a guide member, provided at a position facing the recording head via the transfer belt, to support the transfer belt; a biasing device for biasing the transfer belt in one direction which is the width direction of the transfer belt; and a restriction device configured by the portions of the transfer belt and the guide member to restrict the movement of the transfer belt biased in the one direction by the biasing device.

In the present invention, as described above, the restriction device is configured by the portions of the guide member, provided at the position facing the recording head via the transfer belt, and the transfer belt.

Thus, the restriction device restricts movement (positional deviation) of the transfer belt at the portion of the transfer belt located in the image forming area facing the recording head.

In the present invention, the transfer belt biased by the biasing device is restricted by the restriction device in the portion located in the image forming area, and because of this, the movement of the transfer belt in the width direction is limited.

In the present invention, the portion of the transfer belt located in the image forming area is limited in movement in the width direction by the biasing device and the restriction device. Therefore, the meandering of the transfer belt is inhibited in the portion located in the image forming area.

Consequently, the positional deviation of the recording medium fed to the image forming area is inhibited. Moreover, the positional deviation of the image forming position on the recording medium is preferably inhibited.

The portions of the transfer belt and the guide member, which configure the restriction device, may be configured such that they abut each other due to the biasing from the biasing device.

By doing this, due to the abutting in the aforementioned manner, the transfer belt is more preferably inhibited from meandering compared to a case of not abutting.

In the present invention, the biasing device may include a contact portion of the guide member in contact with the transfer belt. On the contact portion, the frictional resistance against the transfer belt is gradually enlarged in the biasing direction.

In this case, the movement of the transfer belt in the transfer direction is more suppressed in the portion in contact with the area where the frictional resistance is larger among the contact portion of the guide member, because the transfer belt's frictional resistance is larger than in the portion in contact with the area where the frictional resistance is smaller.

The movement of the transfer belt is thus suppressed in the area where the frictional resistance is larger, which causes the transfer belt to gradually move in the direction where the frictional resistance is larger (the biasing direction).

Therefore, in this case as well, the same effect can be obtained as above. Moreover, as compared to the case of allowing the biasing device to be a member disposed at a position different than the guide member, the configuration may be more simplified.

The configuration for changing the frictional resistance in the contact portion as described above is not limited to a single specific configuration; however, it may be configured as follows.

In short, the contact portion may be a plurality of convex portions which are disposed on the surface of the guide member facing the transfer belt, so as to extend approximately parallel to the transfer direction of the transfer belt.

In this case, intervals between the convex portions may be constituted to be gradually narrowed in the aforementioned biasing direction.

This configuration makes the contact area between the transfer belt and the contact portion relatively large for the area on the side of the aforementioned biasing direction, where the intervals between the plurality of convex portions constituting the contact portion are narrow, while relatively small in the area on the side of the direction opposite to the aforementioned biasing direction, where the intervals between the plurality of convex portions are relatively large.

Therefore, the frictional resistance between the transfer belt and the contact portion becomes relatively large in the area on the side of the aforementioned biasing direction where the contact area between the transfer belt and the contact portion is relatively large. On the other hand, the frictional resistance becomes gradually smaller toward the area on the side of the direction opposite to the aforementioned biasing direction where the contact area between the transfer belt and the contact portion is gradually decreased. Therefore, in this mode the same effect as described above is obtained.

In the present invention, the transfer belt may comprise a biasing belt side face, the biasing belt side face being approximately parallel to the transfer direction of the transfer belt, and having a predetermined angle with respect to the belt surface of the transfer belt on which the recording medium is placed.

In this case, the guide member may comprise a biasing guide member side face, the biasing guide member side face being disposed at the position facing the biasing belt side face, being approximately parallel to the transfer direction, and having a predetermined angle with respect to the aforementioned belt surface.

In this case, the biasing device may comprise a biasing member, the biasing member being disposed between the biasing belt side face and the biasing guide member side face, and biasing so as to set apart the biasing belt side face and the biasing guide member side face.

In this mode, the biasing belt side face and the biasing guide member side face are approximately parallel to the transfer direction of the transfer belt. Therefore, during the transferring of the transfer belt, both side faces do not interfere with the movement of the transfer belt by being engaged with each other.

Also, the biasing member functions so as to set apart the biasing belt side face and the biasing guide member side face.

Thus, the function of the biasing member causes the transfer belt having the biasing belt side face to be biased in a direction which is the width direction of the transfer belt. And the movement of the transfer belt in the biasing direction is restricted by the restriction device.

Therefore, in this mode as well, the transfer belt is limited to move in the width direction in the portion located in the image forming area. Consequently, the same effect as above can be obtained, which is that the transfer belt is inhibited from meandering in this portion.

It is preferable that the aforementioned biasing member is fixed to one of either the biasing belt side face or the biasing guide member side face. This configuration avoids the deviation of the disposed position of the biasing member when the transfer belt is moved.

When the biasing member is thus fixed, a sliding member may be provided between the biasing member and the side face opposite to one of either the biasing belt side face or the biasing guide member side face, whichever one to which the biasing member is fixed.

For example, if the biasing member is an elastic member made of metal, the sliding member may be a member made of resin.

One of either the biasing belt side face or the biasing guide member side face, to which the biasing member is unfixed, and the side face of the sliding member facing the side face to which the biasing member is unfixed, may have smooth surfaces for reducing friction between both side faces.

The sliding member may be configured such that it may abut on the entire side face of one of either the biasing belt side face or the biasing guide member side face, to which the biasing member is not fixed. This configuration causes the pressing force from the biasing member to act uniformly on the entire side face to which the biasing member is not fixed.

Additionally, the sliding member may be fixed to the biasing member so as to inhibit deviation from the disposed position of the sliding member during the transfer of the transfer belt.

On the other hand, as long as the aforementioned biasing belt side face is configured to obtain the above described effect, the biasing belt side face is not limited to any specific mode. For example, the biasing belt side face may be a side face of a biasing projection piece which protrudes from the surface of the transfer belt opposite to the belt surface on which the recording medium is placed.

As long as the biasing guide member side face is configured to obtain the above described effect, it is also not limited to any specific mode. For example, the biasing guide member side face may be a side face of a biasing projection piece which protrudes from the surface of the guide member facing the transfer belt.

On the other hand, the restriction device may comprise a restricting belt side face provided on the transfer belt, the restricting belt side face being approximately parallel to the transfer direction of the transfer belt and having a predetermined angle with respect to the belt surface of the transfer belt on which the recording medium is placed, and a restricting guide member side face provided to the guide member so as to face the restricting belt side face, the restricting guide member side face being approximately parallel to the transfer direction, and having a predetermined angle with respect to the aforementioned belt surface.

In this case, because of the abutment between the restricting belt side face and the restricting guide member side face, the movement of the transfer belt biased by the biasing device in one direction, which is the width direction of the transfer belt, is restricted.

The guide member is provided at a position facing the recording head via the transfer belt, as above.

Therefore, in this mode as well, because of the cooperation between the biasing device and the restriction device, the movement of the transfer belt in the width direction is restricted in the portion located in the image forming area. Consequently, the effect that the transfer belt is inhibited from meandering in this area can be obtained.

Additionally, in this case, as the restricting belt side face and the restricting guide member side face are approximately parallel to the transfer direction of the transfer belt, both side faces are not engaged with each other, and do not inhibit the movement of the transfer belt when the transfer belt is actuated.

As long as the aforementioned restricting belt side face is configured to obtain the above described effect, the restricting belt side face is not limited to a specific mode. For example, the restricting belt side face may be a side face of a restricting projection piece which protrudes from the surface of the transfer belt, opposite to the belt surface on which the recording medium is placed.

Also, as long as the restricting guide member side face is configured to obtain the above described effect, the restricting guide member side face is not limited to a specific configuration. For example, the restricting guide member side face may be a side face of a restricting projection piece which protrudes from the surface of the guide member facing the transfer belt.

On the other hand, the biasing device may comprise a transfer roller which is gradually enlarged in the shaft diameter in the aforementioned direction for biasing the transfer belt.

In this case, comparatively large frictional resistance force and pulling tension act upon the portion of the transfer belt wound around a gradually enlarged shaft diameter transfer roller as described above, from the portion of the transfer roller where the shaft diameter is made comparatively large. Conversely, comparatively small frictional resistance force and pulling tension act upon the portion of the transfer belt from the portion of the transfer roller where the shaft diameter thereof is made comparatively small.

The movement of the transfer belt is suppressed in the portion where the transfer roller is gradually enlarged in the shaft diameter and whereby the frictional resistance force and pulling tension applied by the transfer roller is comparatively large. Because of such suppression of movement, the transfer belt is biased toward the side where the frictional resistance force and pulling tension is large (the biasing direction).

Also, as described above, the restriction device restricts the movement of the portion of the transfer belt located in the image forming area, in the biasing direction.

Therefore, in this case as well where a transfer roller which is gradually enlarged in the shaft diameter is provided as above, the meandering of the transfer belt is inhibited in the portion of the transfer belt located in the image forming area.

As a result, the positional deviation is inhibited from occurring to the recording medium fed to the image forming area, and the positional deviation of the image forming position on the recording medium is preferably inhibited.

The biasing device may comprise the transfer roller, of which the shaft orientation is shifted by a predetermined angle with respect to the width direction of the transfer belt so as to bias the transfer belt in one direction (the width direction of the transfer belt).

As a mode of disposing the transfer roller by shifting the shaft direction thereof by a predetermined angle in this manner, the shaft direction of the transfer roller may be shifted so that the pulling tension along the transfer direction applied to the end of the transfer belt in the width direction (the end on the side of the biasing direction) may be larger than that applied to the other end of the transfer belt.

In this case, the transfer belt is biased in the biasing direction to be moved in the biasing direction by the transfer roller, of which the shaft direction is shifted as above.

In this case as well, the restriction device restricts the movement of the portion of the transfer belt located in the image forming area in the biasing direction.

Therefore, in this case as well, the same aforementioned effect is obtained. The meandering of the portion of the transfer belt located in the image forming area and the deviation of the image forming position on the recording medium are inhibited.

Additionally, in the case that a biasing device of another configuration is not provided, when the biasing device is configured in such a manner that the transfer roller is gradually enlarged in shaft diameter or the shaft orientation of the transfer roller is shifted, no additional components are required to configure the biasing device. In short, the effect is obtained that the number of components is reduced.

BRIEF DESCRIPTION OF DRAWINGS

FIG. 9 is an explanatory view showing the relationship between a guide member and a transfer belt in a conveying mechanism of another embodiment.

BEST MODE FOR CARRYING OUT THE INVENTION

An embodiment of the present invention will be described hereinafter with reference to the drawings. The embodiment of the present invention is not limited to the following embodiment, and needless to say various modes can be employed within the technical scope of the present invention.

(First Embodiment)

Figure 1:
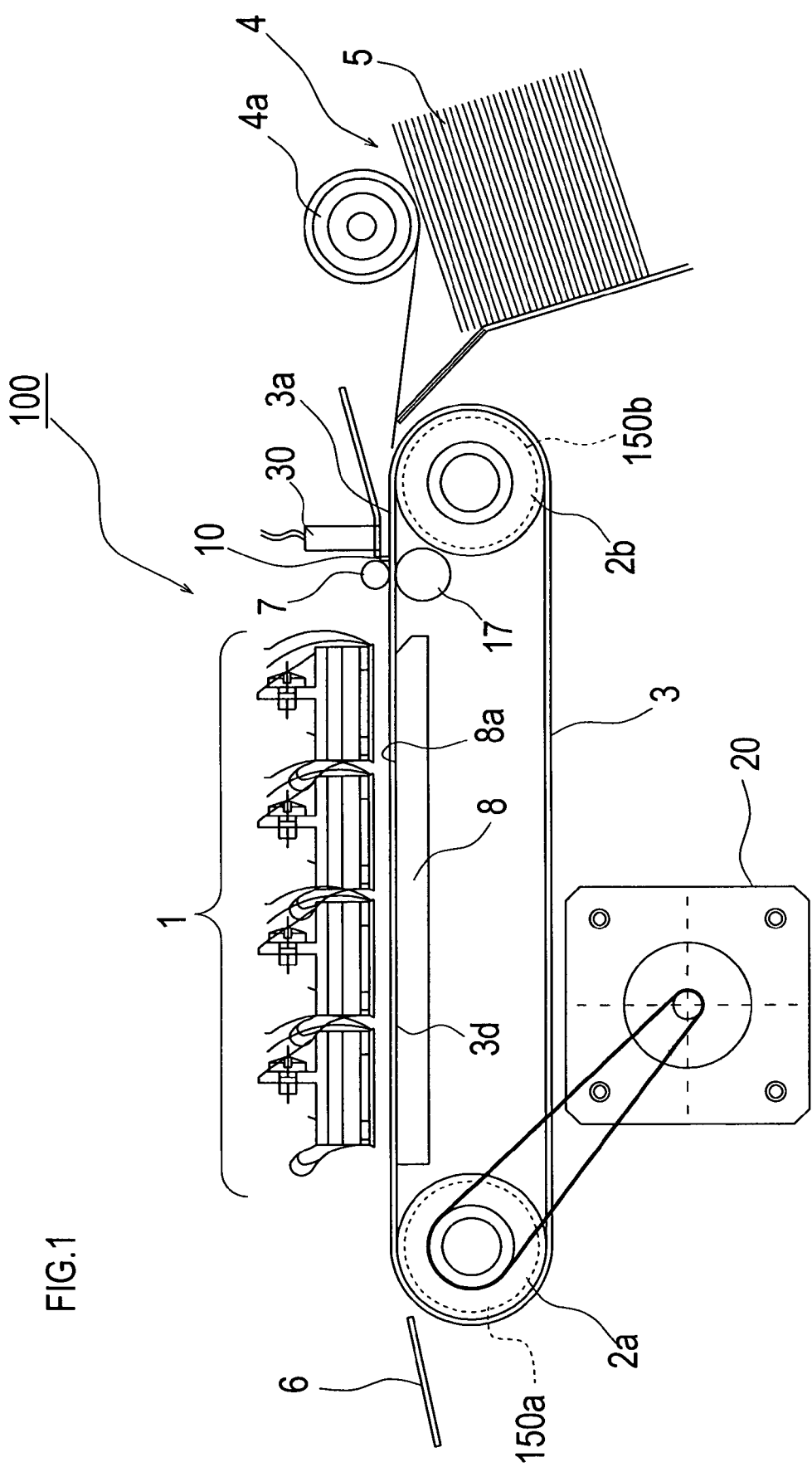
FIG. 1 is a schematic side view showing the main part of an ink jet printer provided with a conveying mechanism of an embodiment.
Figure 2:
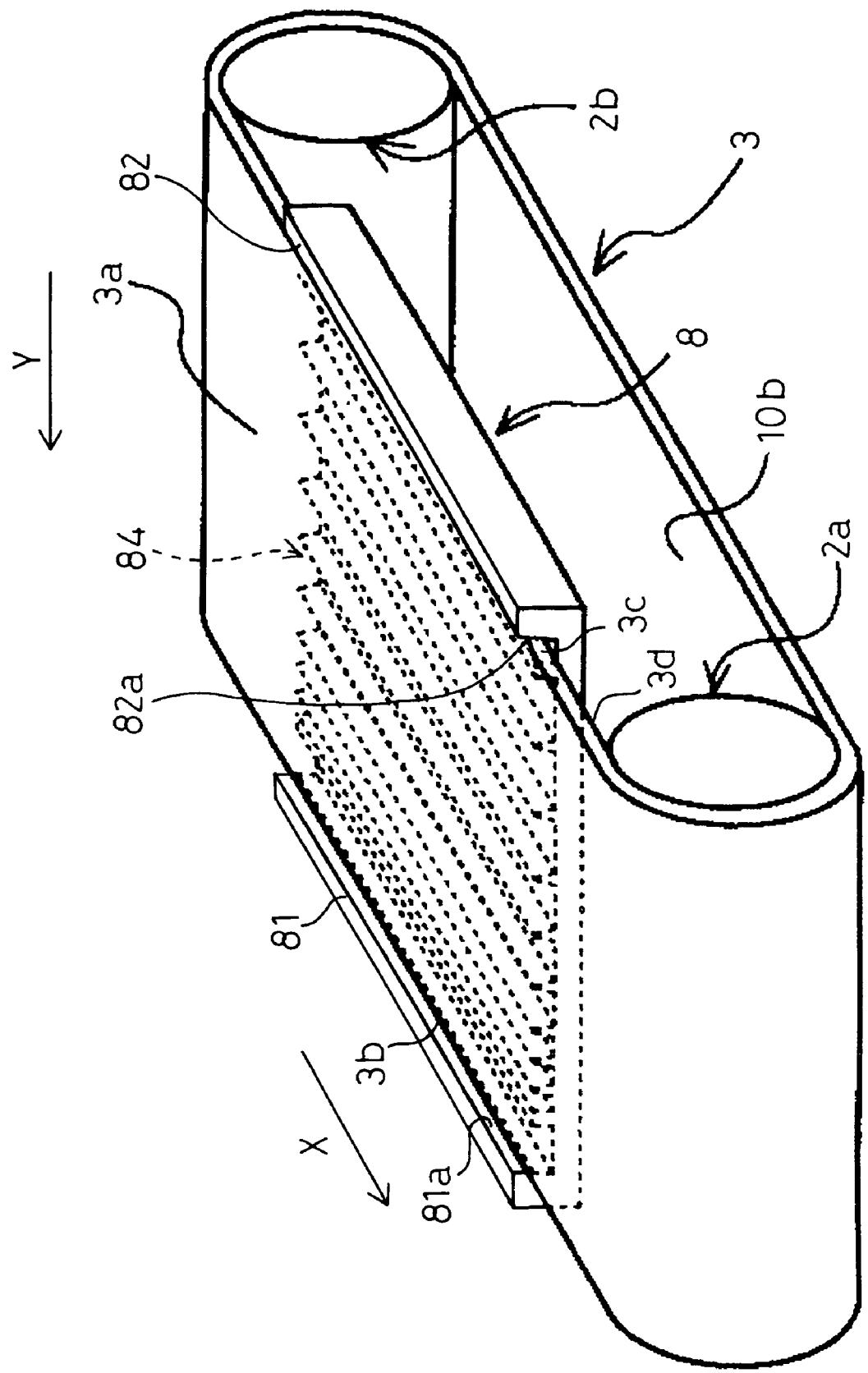
FIG. 2 is a schematic perspective view showing the relationship among a transfer belt, transfer rollers and a guide member in the conveying mechanism of the embodiment.

FIG. 1 is a schematic side view showing the main part of an ink jet printer provided with a conveying mechanism 100 of the present embodiment. FIG. 2 is a schematic perspective view showing the relationship among a transfer belt 3, transfer rollers 2a and 2b, and a guide member 8 in the conveying mechanism 100.

As illustrated in FIG. 1, this printer comprises a print head 1 of an inkjet system, two transfer rollers 2a and 2b, a cylindrical (endless) transfer belt 3 wound around these transfer rollers 2a and 2b, and a guide member 8.

In this printer, a recording medium 5, such as paper and cloth, is fed toward the transfer belt 3 from a supply unit 4 by the drive of a pickup roller 4a. Then the transfer belt 3 transfers the recording medium 5 to an image forming area under the print head 1 by the rotation of the transfer rollers 2a and 2b. Subsequently, an image is formed and recorded on the recording medium 5 by the discharge of ink from the print head 1. Then, the recorded recording medium 5 is transferred to a discharge portion 6.

Among the above components, the print head 1 comprises a drive element, such as a piezoelectric element, for discharging ink droplets from a discharge part. And the print head 1 is of a full-line type which comprises ink discharge parts throughout an area along the direction perpendicular to the transfer direction of the recording medium 5 within a recordable area of the recording medium 5.

The transfer roller 2a of the transfer rollers 2a and 2b is a drive roller driven by a transfer motor 20 (a driving device), while the transfer roller 2b is a follower roller. The number of transfer rollers 2a and 2b is not limited to two, but may be three for example. In this case, one of the transfer rollers may be located below the other two transfer rollers such that downward tension is generated.

A nip roller 7, as a pressing device to press the recording medium 5 against the belt surface 3a of the transfer belt 3, is provided in the vicinity where the recording medium 5 is fed onto the transfer belt 3 (the conveying mechanism 100).

The nip roller 7 faces a receiving roller 17 via the transfer belt 3. The nip roller 7 is configured such that the recording medium 5 is pressed against the transfer belt 3 by sandwiching the recording medium 5 between the two rollers 7 and 17.

This printer comprises a recording medium detection sensor 30, which can detect the feed of the recording medium 5 from the supply unit 4 to the belt surface 3a of the transfer belt 3 for placing the recording medium 5. In this printer, the recording medium 5 is transferred based upon a detection signal from this sensor 30.

A bump section 10 is provided on the belt surface 3a of the transfer belt 3 to properly position the end of the recording medium 5. It is therefore possible for the supplied recording medium 5 to be arranged at a predetermined position on the belt surface 3a. A plurality of bump sections 10 are provided along the direction perpendicular to the transfer direction of the transfer belt 3. When these bump sections 10 are located at a position closer to the supply unit than the nip roller 7, the recording medium 5 is fed and the front end of the recording medium 5 is properly positioned along the plurality of bump sections 10. On the peripheral surface of the nip roller 7, grooves are formed at positions where the bump sections 10 pass in order to avoid the nip roller 7 from rising onto the bump sections 10.

In the image forming area under the print head 1, the guide member 8 is provided at a position facing the print head 1 via the transfer belt 3.

The guide member 8 is a plate-like member made of materials such as metal and resin. In the present embodiment, the guide member 8 has a wider configuration (approximately rectangular configuration) than the transfer belt 3. The guide member 8 is arranged such that both ends of the guide member 8 in the width direction protrude from both edges of the transfer belt 3 in the width direction.

The guide member 8 supports the transfer belt 3. In the present embodiment, the guide member 8 is configured to contact the under surface of the transfer belt 3 and to apply an upward tension to the transfer belt 3. Consequently, the distance is maintained between the recording medium 5 to be transferred by the transfer belt 3 and the print head 1, so that preferable image forming may be realized.

As illustrated in FIG. 2, projection pieces 81 and 82 are provided so as to extend along the transfer direction X of the transfer belt 3 on both ends, in the width direction, of the upper surface 8a of the guide member 8 facing the transfer belt 3.

A right side face 81a of the left side projection piece 81 faces a left side face 3b of the transfer belt 3, while a left side face 82a of the right side projection piece 82 faces a right side face 3c of the transfer belt 3.

A plurality of ribs 84 are provided so as to extend approximately parallel to the transfer direction X on the inner portion in the width direction within the area of the upper surface 8a of the guide member 8.

Each of the ribs 84 has an approximately triangular cross section tapered upward, the cross section thereof being extended in the transfer direction X. The rib 84 is configured to abut the inner surface 3d of the transfer belt 3, which is opposite to the belt surface 3a of the transfer belt 3.

The intervals between the ribs 84 are designed to be gradually narrowed in the left direction Y, which is in the width direction of the transfer belt 3. The ribs 84 are distributed more densely on the left side than on the right side.

Thus, in the present embodiment, the contact area between the transfer belt 3 and the plurality of ribs 84 becomes relatively large in the area located in the left direction Y where the intervals between the ribs 84 are narrower. Conversely, the contact area becomes relatively small in the area located in the right direction where the intervals between the ribs 84 are larger.

Therefore, the frictional resistance between the transfer belt 3 and the plurality of ribs 84 becomes relatively large in the area located in the left direction Y where the contact area between the transfer belt 3 and the plurality of ribs 84 is relatively large. The frictional resistance becomes gradually smaller in the area located in the right direction where the contact area between the transfer belt 3 and the plurality of ribs 84 is gradually decreased.

In this case, in the area of the transfer belt 3 in the left direction Y where the frictional resistance from the plurality of ribs 84 is relatively large, the movement of the transfer belt 3 along the transfer direction X is suppressed. As the movement of the transfer belt 3 is suppressed, the transfer belt 3 gradually moves in the left direction Y. In short, in the present embodiment, the plurality of ribs 84 perform a function of biasing the transfer belt in the left direction Y.

However, the movement of the transfer belt 3 in the left direction Y is limited and restricted by the abutment between the right side face 81a of the projection piece 81 and the left side face 3b of the transfer belt 3.

The restriction in the movement of the transfer belt 3 in the left direction Y by abutting the right side face 81a of the projection piece 81 is made in the portion of the transfer belt 3 located in the image forming area.

Therefore, in the present embodiment, the portion of the transfer belt 3 located in the image forming area is restricted in movement in the width direction, because of the biasing from the plurality of ribs 84 and the restriction by the abutment between the right side face 81a and the left side face 3b.

Due to the restriction as above, the portion of the transfer belt 3 located in the image forming area is inhibited from meandering around the transfer rollers 2a and 2b.

As a result, the occurrence of positional deviation of the recording medium 5 fed to the image forming area can be suppressed, and the positional deviation of the image forming position upon the recording medium 5 is also preferably suppressed.

The print head 1 corresponds to a recording head. The plurality of ribs 84 correspond to a plurality of convex portions (contact portion). The projection piece 81 on the left side of the guide member 8 corresponds to a restricting projection piece. The right side face 81a of the projection piece 81 corresponds to a restricting guide member side face. And the left side face 3b of the transfer belt 3 corresponds to a restricting belt side face.

In the present embodiment, it is described that the cross sections of the plurality of ribs 84 have approximately triangular configurations with the top edges thereof removed. However, as long as the contact area of the ribs 84 is able to be altered, the cross sections thereof may have approximately square, polygonal, and semicircular, etc. configurations.

The plurality of ribs 84 are configured such that the frictional resistance with the transfer belt 3 gradually increases along the left direction Y. However, any configuration other than the plurality of ribs 84 may be applied as long as it has a similar biasing function. For example, the contact surface with the transfer belt 3 may be configured such that roughness of the surface gradually increases along the left direction Y. Alternatively, the contact surface, of the guide member, may be configured such that the frictional resistance with the transfer belt 3 gradually increases toward the left direction Y by applying a lubricant to the contact surface on the right side. Also, these configurations may be such that the frictional resistance gradually increases toward the right direction, which is an opposite direction to the left direction Y.

(The Second Embodiment)

In the conveying mechanism of the present embodiment, only the configurations of the transfer belt and the guide member differ from those of the aforementioned first embodiment. Therefore, only the different configurations will be mainly described, while the components with the same configurations are denoted with the same reference numerals and the description of the same is omitted.

Figure 3:
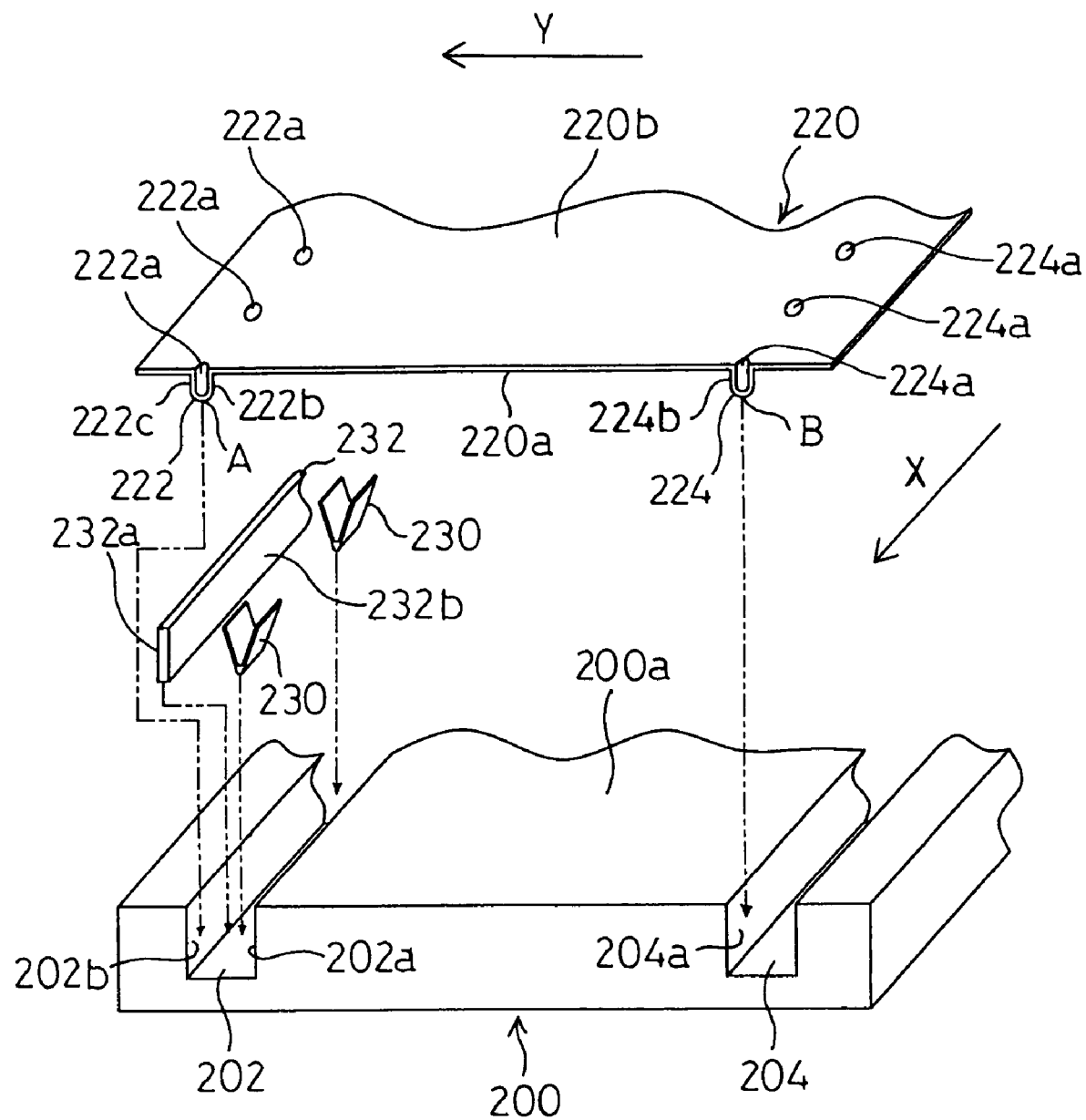
FIG. 3 is an explanatory view showing the relationship among a guide member, a transfer belt, blade springs and a sliding member in a conveying mechanism of another embodiment.

FIG. 3 is an explanatory view showing the relationship between a guide member 200 and a transfer belt 220 in the conveying mechanism of the present embodiment.

The guide member 200 of the present embodiment is provided at a position facing the print head 1 (image forming area) via the transfer belt 220 like the guide member 8 of the first embodiment.

The guide member 200 of the present embodiment is disposed so as to slightly push up the transfer belt 220 from the under surface of the transfer belt 220, thereby applying tension to the transfer belt 220.

However, if the configuration may be such that tension is applied to the transfer belt 220 by biasing a transfer roller 2b, which is a follower roller of a pair of transfer rollers 2a and 2b, in the direction away from the transfer roller 2a, the guide member 200 does not need to push up the transfer belt 220. In the present embodiment unlike the first embodiment, the frictional resistance between the upper surface of the guide member 200 and the inner surface of the transfer belt 220 is not used for biasing the transfer belt 220.

The guide member 200 comprises neither the projection pieces 81 and 82, nor the ribs 84, as in the first embodiment. Grooves 202 and 204, extending along the transfer direction X of the transfer belt 200, are provided in the vicinity of both ends of the guide member 200 in the width direction. The grooves 202 and 204 have cross sections of square configurations.

A plurality of bosses 222 and 224 are provided on the inner surface 220a of the endless transfer belt 220 (which is the surface facing the guide member 200) at regular intervals at positions respectively corresponding to the grooves 202 and 204.

In the present embodiment, the plurality of bosses 222 and 224 are formed integrally with the transfer belt 220 using the same material (for example, rubber-like resin) as the transfer belt 220.

Specifically, the plurality of bosses 222 and 224 have approximately hemispheric hollow configurations. The peripheral portions of the hollow portions 222a and 224a are connected to the belt surface 220b of the transfer belt 220.

When the transfer belt 220 is transferred by the transfer rollers 2a and 2b, the plurality of bosses 222 and 224 are guided to be respectively disposed within the grooves 202 and 204, and to be moved within these grooves.

The bosses 222 and 224 are projection pieces projected to a predetermined length which is shorter than the depth of the grooves 202 and 204, respectively. Therefore, when the bosses 222 and 224 move within the grooves 202 and 204, the tips A and B of the bosses 222 and 224 do not contact the bottom portions of the grooves 202 and 204. Thus, due to no contact between, the bosses 222 and 224, and the grooves 202 and 204, friction is reduced between the bosses 222 and 224 (which move within the grooves 202 and 204 respectively), and the inner surfaces of the grooves 202 and 204.

In the present embodiment, concave portions 150a and 150b, capable of receiving the plurality of bosses 222 and 224, are provided on the surface of the transfer rollers 2a and 2b, respectively (refer to FIG. 1).

A plurality of blade springs 230 and a sliding member 232 are provided within the groove 202 in addition to the plurality of bosses 222.

Specifically, the plurality of blade springs 230 are disposed between the right side faces 222b of the plurality of bosses 222 and the right inner side face 202a of the groove 202. In the present embodiment, the plurality of blade springs 230 are disposed so as to abut the right inner side face 202a of the groove 202. The sliding member 232 is disposed between the right side faces 222b of the bosses 222 and the plurality of blade springs 230.

In the present embodiment, the plurality of blade springs 230 are elastic members made of metal and have approximately V-shaped cross sections. The sliding member 232 is a member made of resin, and is a plate-like member extending along the entire length of the groove 202 in the transfer direction X, so as to abut all of the right side faces 222b of the plurality of bosses 222.

The plurality of blade springs 230 are provided to bias the bosses 222 toward the left direction Y. The sliding member 232 is provided to apply the biasing force of the blade springs 230 equally to each of the bosses 222.

The left side face 232a of the sliding member 232, both side faces 222b and 222c of the bosses 222, and the left inner side face 202b of the groove 202 have smooth surfaces to reduce the friction caused between the various faces when the plurality of bosses 222 move within the groove 202. If necessary, lubricant may be applied to these portions to reduce friction.

Lubricant is applied to the inner surface of the groove 204 and the side faces of the bosses 224 to reduce the friction between them. In order to reduce friction, it is preferable that they also have smooth surfaces.

The plurality of blade springs 230 and the sliding member 232 are retained at predetermined positions within the groove 202 so as to inhibit the positional deviation by the plurality of bosses 222 moving within the groove 202.

Specifically, for example, the blade springs 230 and the sliding member 232 may be retained at predetermined positions due to the frictional engagement among the right inner side face 202a of the groove 202, the blade springs 230, and the sliding member 232.

Figure 4A:
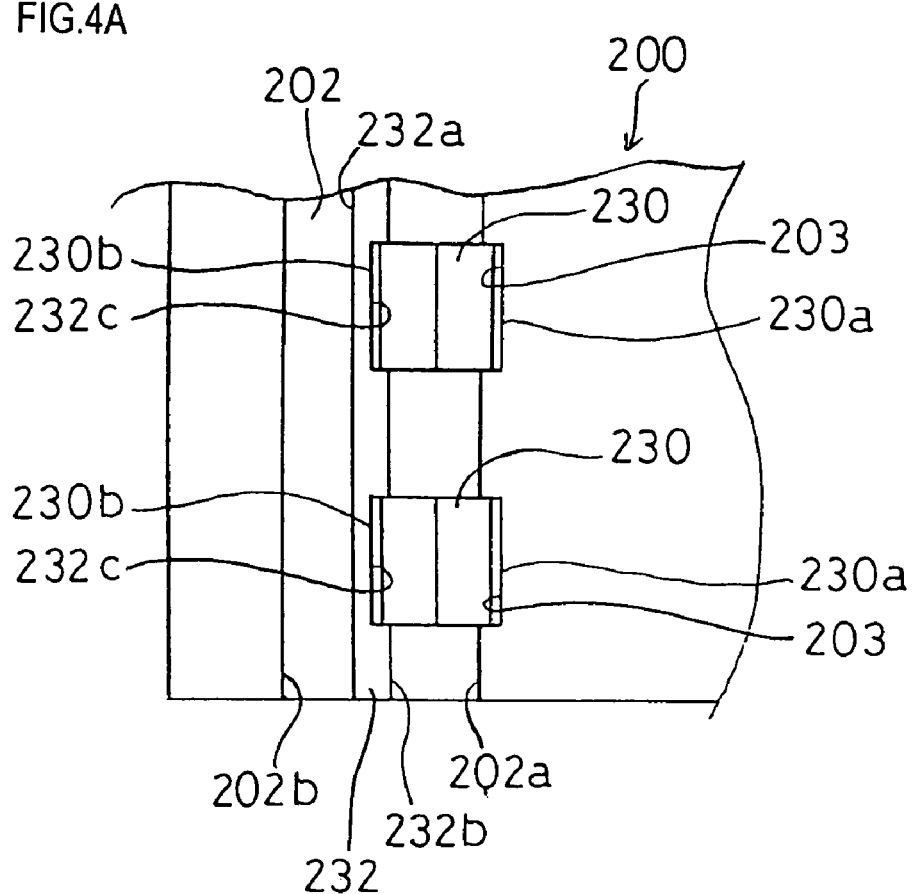
FIG. 4A and FIG. 4B are explanatory views showing retention configurations of blade springs and sliding members of other embodiments.
Figure 4B:
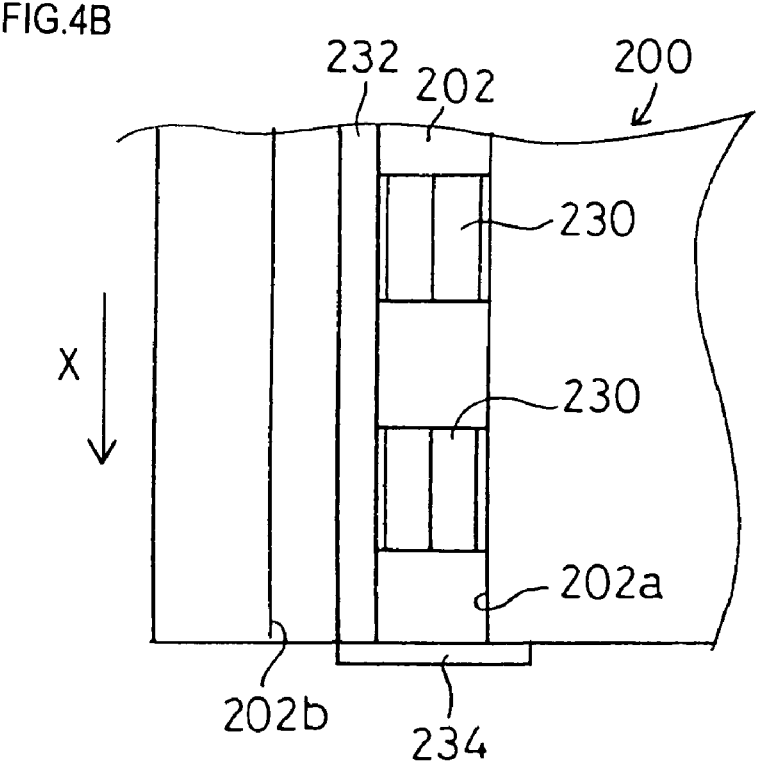

The blade springs 230 and the sliding member 232 may be retained at predetermined positions by adopting the configuration illustrated in FIG. 4A and FIG. 4B.

In FIG. 4A, the right edge portions 230a of the blade springs 230 are fit to fitting concave portions 203 provided on the right inner side face 202a of the groove 202 so that the blade springs 230 are fixed to the right inner side face 202a. The left edge portions 230b of the blade springs 230 are fitted to fitting concave portions 232c provided on the right side face 232b of the sliding member 232 so that the sliding member 232 is fixed to the blade springs 230 and the right inner side face 202a.

In FIG. 4B, a cover member 234 is provided to the end portion of the groove 202 in the transfer direction X to inhibit the positional deviation of the blade springs 230 and the sliding member 232 to the outside of the groove 202. Therefore, the blade springs 230 and the sliding member 232 are positioned within the groove 202.

In order to fit the transfer belt 220 to the guide member 200, first, the guide member 200 is disposed beneath the transfer belt 220 as illustrated in FIG. 3. Then, the plurality of bosses 222 and 224 are inserted within the grooves 202 and 204 respectively (as illustrated by chain double-dashed line arrows in FIG. 3). Before or after this insertion, the plurality of blade springs 230 and the sliding member 232 are disposed within the groove 202 to duplicate the above arrangement.

In the case that the blade springs 230 and the sliding member 232 are fit to be positioned within the groove 202 as illustrated in FIG. 4A, it is preferable to dispose the plurality of blade springs 230 and the sliding member 232 within the groove 202 before insertion of the bosses 222 and 224 as detailed above.

In the conveying mechanism configured as above, the plurality of bosses 222 moving within the left groove 202 are biased in the left direction Y by the plurality of blade springs 230. As a result, the right side faces 222b of the plurality of bosses 222 and the right inner surface 202a of the groove 202 are set apart, and consequently the portion of the transfer belt 220 located in the image forming area is gradually moved in the left direction Y.

However, in the present embodiment, the movement of the portion of the transfer belt 220 located in the image forming area is limited and restricted due to the abutment between the left side faces 224b of the plurality of bosses 224 provided on the right side of the transfer belt 220, and the left inner side face 204a of the right groove 204.

Thus, in the present embodiment, the portion of the transfer belt 3 located in the image forming area is restricted in the movement in the width direction, due to the biasing from the plurality of blade springs 230 and the restriction by the abutment between the left side faces 224b and the left inner side face 204a.

Due to the restriction described above, the portion of the transfer belt 220 located in the image forming area is inhibited from meandering when transferred by the transfer rollers 2a and 2b.

As a result, occurrence of positional deviation of the recording medium 5 fed to the image forming area can be suppressed, and positional deviation of the image forming position on the recording medium 5 is also preferably suppressed.

The plurality of bosses 222 correspond to biasing projection pieces. The right side faces 222b of the plurality of bosses 222 correspond to biasing belt side faces. The right inner side face 202a of the groove 202 corresponds to a biasing guide member side face. And the plurality of blade springs 230 correspond to biasing members. The plurality of bosses 224 correspond to restricting projection pieces. The left side faces 224b of the plurality of bosses 224 correspond to restricting belt side faces. And the left inner side face 204a of the groove 204 corresponds to a restricting guide member side face.

In the present embodiment, the plurality of blade springs 230 are applied to bias the bosses 222. However, it is possible to configure that a single blade spring 230 is provided to bias the bosses 222, thereby reducing the number of components. In this case, the blade spring 230 may be a member extending along the entire length of the groove 202 in the transfer direction X so that the blade spring 230 may bias the plurality of bosses 222 equally toward the left direction Y. An elastic body with another configuration (such as coil spring) or an elastic body made of another material (such as rubber like resin) may be used as a biasing member instead of the blade spring 230.

The plurality of bosses 222 and 224 may be configured as a single boss 222 and 224 respectively. As an example of the case in which the plurality of bosses 222 and 224 are configured as a single boss 222 and 224 respectively, the plurality of bosses 222 and 224 are configured as a single linear convex portion.

The bosses 222 and 224 may be configured to be made of different materials (such as resin, metal, etc.) than the transfer belt 220 to be fixed to the transfer belt 220.

According to the present embodiment, the blade springs 230 and the sliding member 232 are separate members. However, they may be integrally formed by adopting a configuration such that a resin film functioning as the sliding member 232 is laminated onto the surface of the blade springs 230 facing the bosses 222.

By doing this, when the blade springs 230 are placed within the groove 202 the sliding member 232 is also placed within the groove 202. Therefore, the assembly work is simplified.

The sliding member 232 may also be integrally formed with the right side faces 222b of the bosses 222. In this case as well, the assembly work of the conveying mechanism is simplified.

In the present embodiment, an additional description is made concerning the mode in which by fitting the blade springs 230 to the fixing concave portions 203, the blade springs 230 are fixed to the right inner side face 202a of the groove 202 (refer to FIG. 4A). The blade springs 230 may be fixed by adhesion, screw cramp, or the like.

The blade springs 230 may be fixed to the right side faces 222b of the bosses 222 instead of the right inner side face 202a of the groove 202. In this case, the sliding member 232 may be placed between the blade springs 230 and the right inner side face 202a of the groove 202. When the sliding member 232 is to be placed thus, the sliding member 232 may be formed by laminating resin film (functioning as the sliding member 232), on the surfaces of the blade springs 230 facing the right inner side face 202a, or on the right inner side face 202a of the groove 202. When the sliding member 232 made of resin is to be disposed between the blade springs 230 and the right inner side face 202a of the groove 202, for example, the guide member 200 may be the member made of resin and the right inner side face 202a of the groove 202 may be configured as a smooth surface. Consequently, it may become unnecessary to dispose the sliding member 232 as a separate member.

In the present embodiment, the movement of the transfer belt 220 toward the left direction Y is restricted by making the left side faces 224b of the bosses 224 abut the left inner side face 204a of the right groove 204. However, the movement of the transfer belt 220 toward the left direction Y may be restricted by making the left side faces 222c of the bosses 222 abut the left inner side face 202b of the left groove 202.

In this way, the same effect as above is obtained in that the meandering of the portion of the transfer belt 220 located in the image forming area as well as the positional deviation of the image forming position on the recording medium 5 is inhibited. Additionally, the right groove 204 and the bosses 224 can be omitted. Thus the production of the guide member 200 and the transfer belt 220 becomes simplified.

In this case, the plurality of bosses 222 correspond to restricting projection pieces. The left side faces 222c of the plurality of bosses 222 correspond to restricting belt side faces. And the left inner side face 202b of the groove 202 corresponds to a restricting guide member side face.

As long as the transfer belt 220 can be transferred straight along the transfer direction X, locations of the groove 202 and the bosses 222 are not limited to portions in the vicinity of the respective left ends of the guide member 200 and the transfer belt 220. Locations of the groove 204 and the bosses 224 are also not limited to portions in the vicinity of the respective right ends of the guide member 200 and the transfer belt 220.

Also, the sliding member 232 may be omitted when frictional force generated by the blade springs 230, directly sliding upon the bosses 222 and the right inner side face 202a of the groove 202, is small enough not to hinder the transfer of the transfer belt 220.

Furthermore, a roller or bearing may be provided in the portion used to restrict the movement of the transfer belt 220 toward the left direction Y by abutment, i.e. the portion between the left side faces 224b of the right bosses 224 and the left inner side face 204a of the right groove 204, or the portion between the left side faces 222c of the left bosses 222 and the left inner side face 202b of the groove 202.

This allows the frictional force generated in the abutting portion to be sufficiently reduced in order to enable the smooth operation of the transfer belt 220.

On the other hand, as for the guide member, the following mode is also possible.

In short, the upper surface 200a, which is between the left groove 202 and the right groove 204 in the width direction and directly faces the transfer belt 220, may be formed as a smooth surface as illustrated in FIG. 3. In this case, the flatness of the portion of the transfer belt 220 located in the image forming area can be improved upon by pressing the upper surface 200a against the transfer belt 220.

Figure 5:
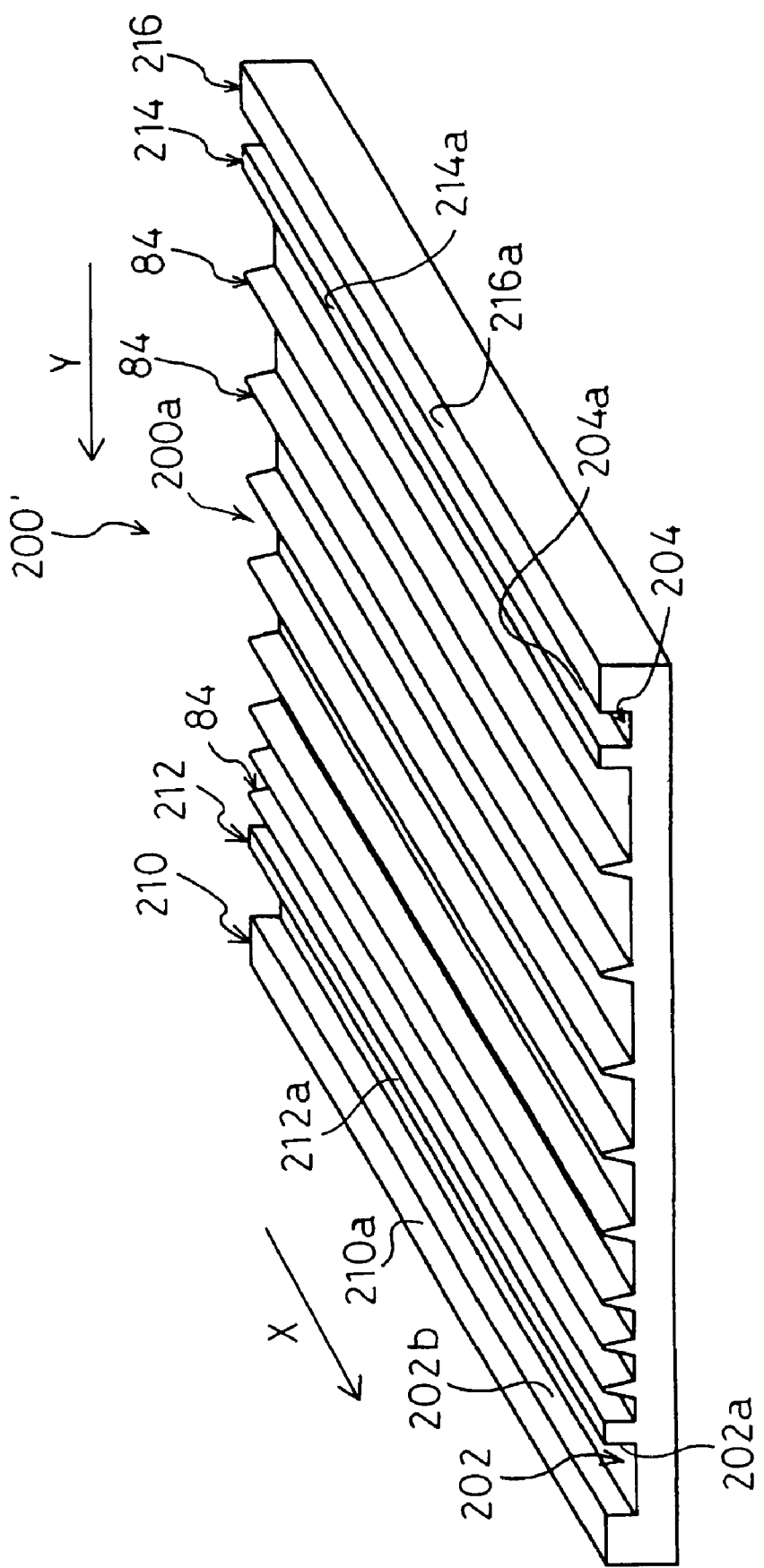
FIG. 5 is a perspective view showing a configuration of a guide member of another embodiment.
Figure 6:
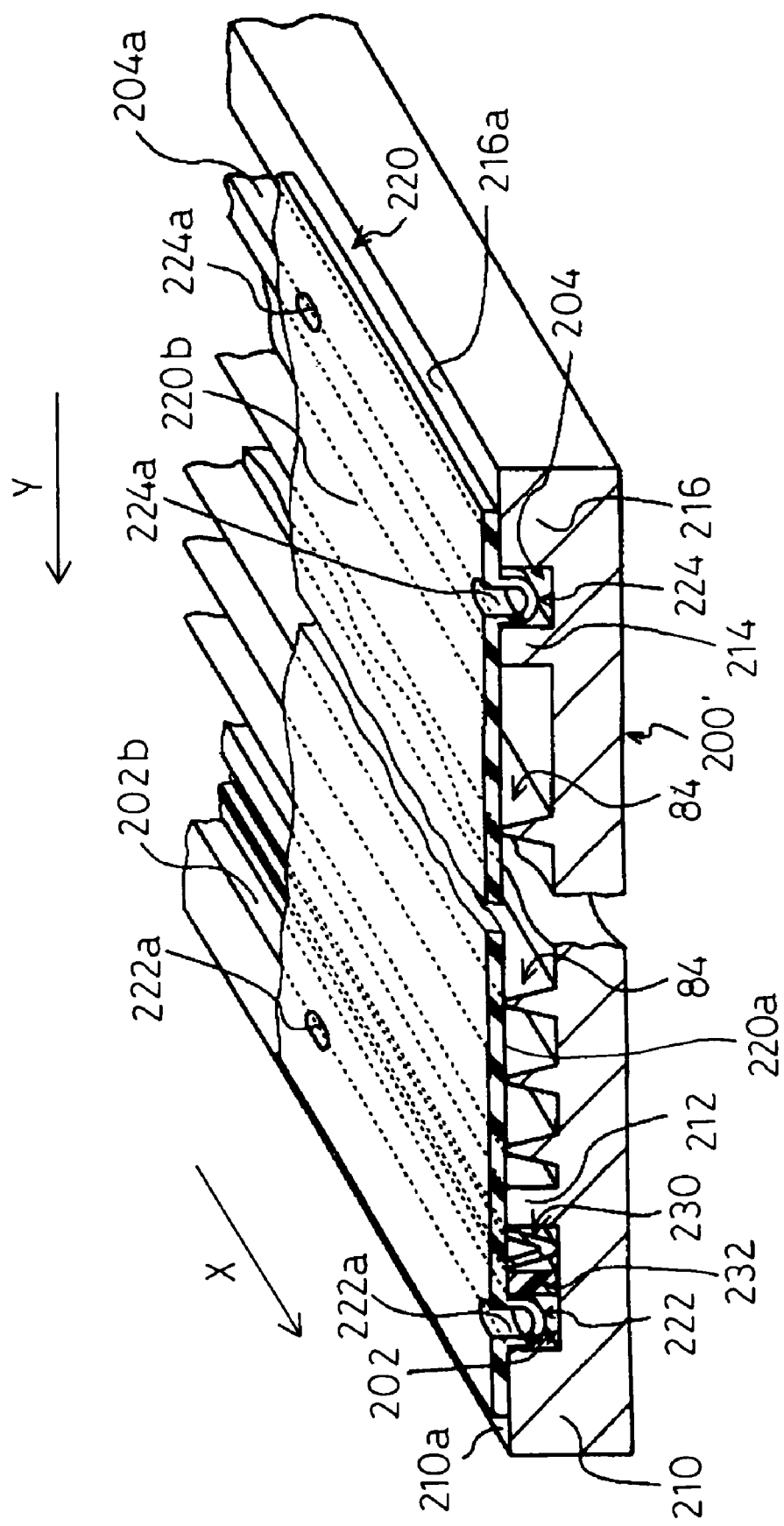
FIG. 6 is an explanatory view showing the relationship among a guide member, a transfer belt, a blade spring and a sliding member in a conveying mechanism of another embodiment.

The upper surface 200a may also be configured as a plurality of ribs 84 having the same configurations and functions as the plurality of ribs 84 of the first embodiment as illustrated in FIGS. 5 and 6.

In the mode illustrated in FIGS. 5 and 6, the left groove 202 is delimited between the ribs 210 and 212, which have rectangular cross sections and extend along the transfer direction X at the left end portion of the guide member 200'. The right groove 204 is delimited between the ribs 214 and 216, which have rectangular cross sections and extend along the transfer direction X at the right end portion of the guide member 200'. The upper surfaces 210a, 212a, 214a, and 216a, of these ribs 210, 212, 214, and 216, function as abutting surfaces against the inner surface 220a of the transfer belt 220.

In the mode illustrated in FIGS. 5 and 6, the transfer belt 220 is biased by the plurality of ribs 84 abutting the inner surface 220a as well as by the blade springs 230.

Thus, the portion of the transfer belt 220 located in the image forming area is more certainly biased and moved in the left direction Y. That movement is restricted by the abutment between the left side faces 224b of the right bosses 224 and the left inner side face 204a of the right groove 204, or by the abutment between the left side faces 222c of the left bosses 222 and the left inner side face 202b of the left groove 202.

According to the mode illustrated in FIGS. 5 and 6, due to such certain biasing and restriction, the portion of the transfer belt 220 located in the image forming area is inhibited from significantly meandering. The positional deviation of the image forming position upon the recording medium 5 is inhibited preferably.

On the other hand, the configuration wherein the transfer belt 220 is biased by the blade spring 230, is applicable to the first embodiment, as is the present embodiment.

Specifically, the blade spring 230 is disposed between the left side face 82a of the right projection piece 82 and the right side face 3c of the transfer belt 3 (illustrated in FIG. 2), so that the left side face 82a and the right side face 3c are set apart by the biasing force from the blade spring 230.

The blade spring 230 may be fixed to either the left side face 82a or the right side face 3c. When the blade spring 230 is fixed in this manner, the sliding member 232 may be disposed between the side face to which the blade spring 230 is not fixed, and the blade spring 230.

In this case, the transfer belt 3 can be biased from the blade spring 230 as well as from the plurality of ribs 84.

Therefore, as in the mode illustrated in the aforementioned FIGS. 5 and 6, the portion of the transfer belt 3 located in the image forming area is inhibited from significantly meandering, and positional deviation of the image forming position on the recording medium 5 is preferably more inhibited.

In this case, the right projection piece 82 corresponds to a restricting projection piece. The left side face 82a of the projection piece 82 corresponds to a restricting guide member side face. And the right side face 3c of the transfer belt 3 corresponds to a restricting belt side face.

(The Third Embodiment)

In the conveying mechanism of the present embodiment, only the configurations of the transfer belt and the guide member mainly differ from those of the aforementioned first embodiment. Therefore, only the different configurations will be mainly described, while the components with the same configurations are denoted with the same reference numerals and a description of the same is omitted.

Figure 7:
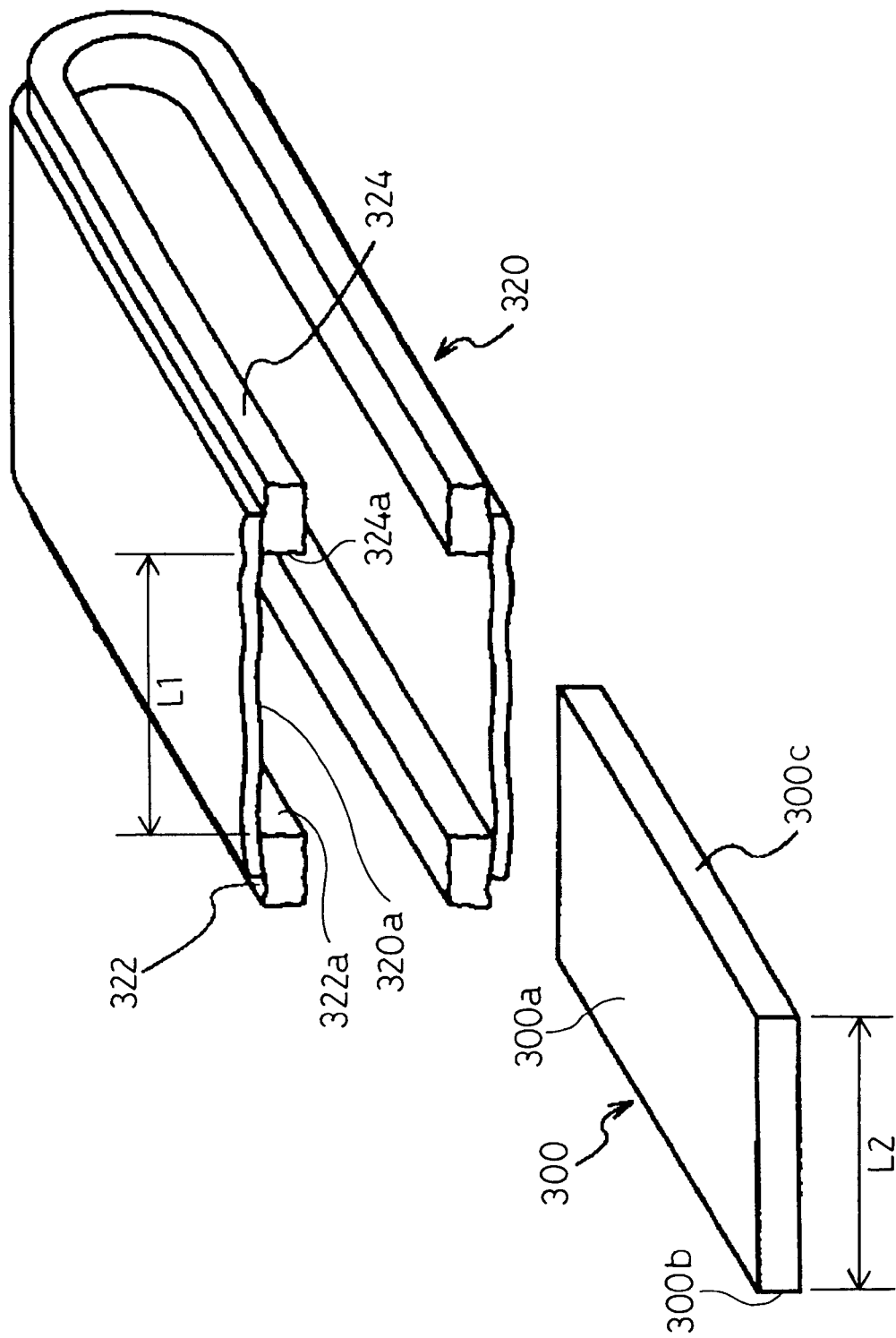
FIG. 7 is an explanatory view of a configuration of a guide member and a transfer belt in a conveying mechanism of another embodiment.

FIG. 7 is an explanatory view showing the relationship between a guide member 300 and a transfer belt 320 in the conveying mechanism of the present embodiment.

The guide member 300 of the present embodiment is provided at a position facing the print head 1 (image forming area) via the transfer belt 320, like the guide member 8 of the first embodiment. The guide member 300 is a plate-like member with a configuration such as a rectangular parallelepiped.

A transfer belt 320 has a ring configuration (endless configuration). Ring-shaped endless guide portions 322 and 324 are provided on both of the entire peripheral portions of an inner surface 320a in the width direction, the inner surface 320a being the surface of the transfer belt 320 directly facing the guide member 300.

It could be said that the guide portions 322 and 324 are projection pieces protruding from the inner surface 320a. The left end portion of the left guide portion 322 and the right end portion of the right guide portion 324 respectively protrude outwardly from the left end and the right end of the transfer belt 320. And the guide portions 322 and 324 have portions partially unwrapped beyond the transfer belt 320.

The distance L1 between the opposed surfaces of the left and the right guide portions 322 and 324 (a right side face 322a of the left guide portion 322 and a left side face 324a of the right guide portion 324) is set to be longer than the width L2 of the guide member 300.

When the transfer belt 320 is wound around the transfer rollers 2a and 2b, the guide member 300 is positioned between the left and right guide portions 322 and 324, with the upper surface 300a of the guide member 300 abutting the inner surface 320a of the transfer belt 320. Then, the left side face 300b of the guide member 300 faces the right side face 322a of the left guide portion 322, while the right side face 300c of the guide member 300 faces the left side face 324a of the right guide portion 324.

Figure 8:
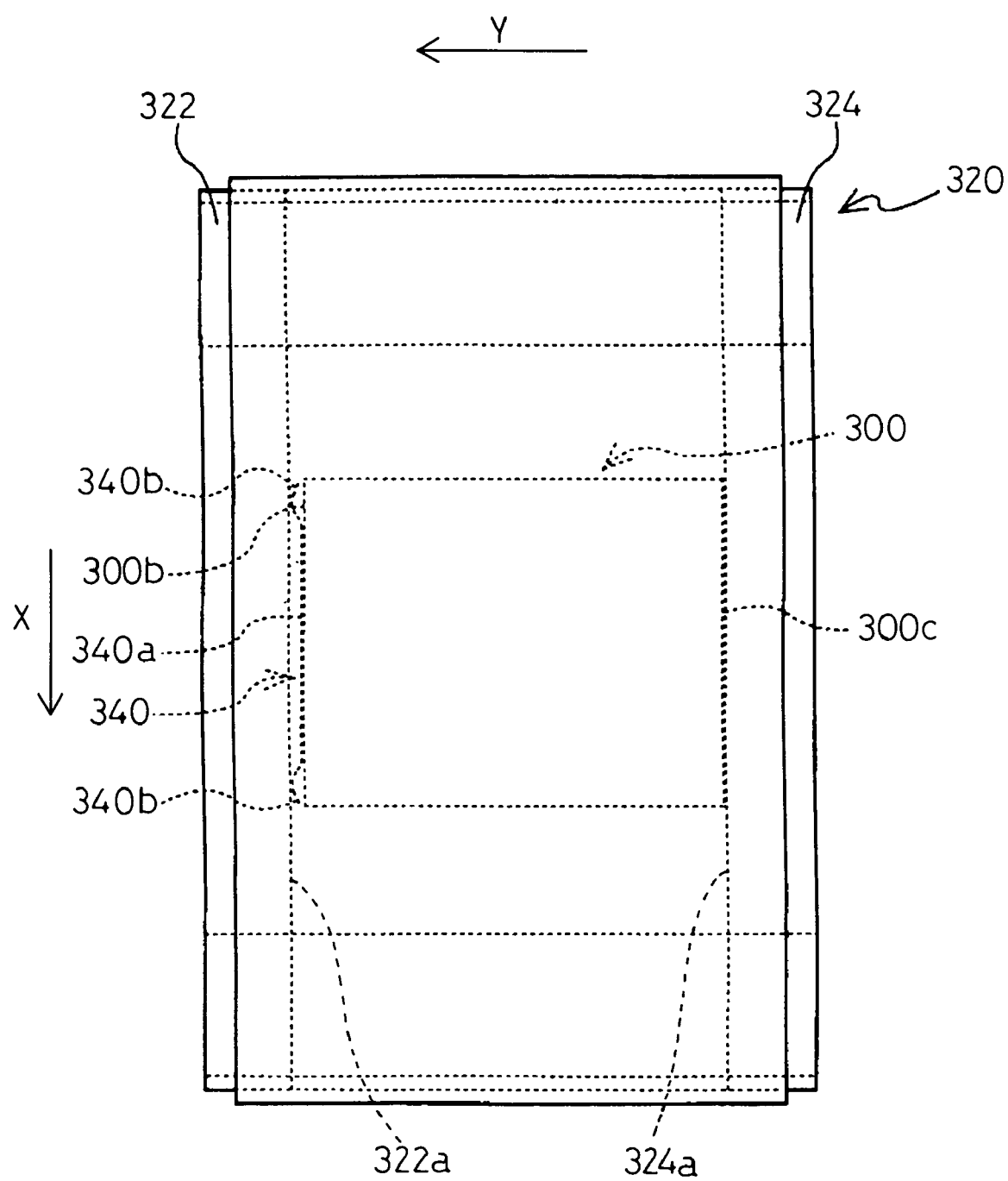
FIG. 8 is an explanatory view showing the relationship among a guide member, a transfer belt, and a member for biasing the transfer belt in a conveying mechanism of another embodiment.

As illustrated in FIG. 8, the member 340 is affixed on the left side face 300b of the guide member 300 to bias the left guide portion 322 (consequently, the transfer belt 320) in the left direction Y.

In the present embodiment, this member 340 is constructed using piano wire. In this member 340, the central portion of the member 340, in the transfer direction X of the recording medium 5, is along the left side face 300b. The vicinities of the upstream (upper side of FIG. 8) and the downstream (lower side of FIG. 8) end portions of the member 340, along the transfer direction X, have swollen configurations.

The portion along the left side face 300b of this member 340 is configured to have a fixed portion 340a fixed to the left side face 300b. The portions which swell at both the upper and lower ends of the fixed portion 340a are constituted to be biasing portions 340b.

When the guide member 300 is placed between the guide portions 322 and 324 as above, the biasing portions 340b abut the right side face 322a of the left guide portion 322 (refer to FIG. 8).

The biasing portions 340b bias so as to set apart the left side face 300b from the right side face 322a. In short, in the present embodiment, the portion of the transfer belt 320 located in the image forming area is gradually moved in the left direction Y by the biasing from the biasing portions 340b.

However, in the present embodiment, the movement of the portion of the transfer belt 320 located in the image forming area toward the left direction Y, is limited and restricted by the abutment between the right side face 300c of the guide member 300 and the left side face 324a of the right guide portion 324 (refer to FIG. 8).

Therefore, in the present embodiment, the portion of the transfer belt 320 located in the image forming area is restricted in movement in the width direction, because of the biasing from the biasing portions 340b and the restriction by the abutment between the right side face 300c and the left side face 324a.

Due to the restriction above, the portion of the transfer belt 320 located in the image forming area is inhibited from meandering when transferred by the transfer rollers 2a and 2b.

As a result, occurrence of positional deviation of the recording medium 5 fed to the image forming area can be suppressed, and positional deviation of the image forming position upon the recording medium 5 is also suppressed preferably.

The left guide portion 322 corresponds to a biasing projection piece. The right side face 322a of the guide portion 322 corresponds to a biasing belt side face. The left side face 300b of the guide member 300 corresponds to a biasing guide member side face. And the biasing portions 340b correspond to biasing members. The right guide portion 324 corresponds to a restricting projection piece. The left side face 324a of the guide portion 324 corresponds to a restricting belt side face. And the right side face 300c of the guide member 300 corresponds to a restricting guide member side face.

The upper surface 300a of the guide member 300 may be configured as a smooth surface as illustrated in FIG. 7. The flatness of the portion of the transfer belt 320 located in the image forming area can be improved by pressing the upper surface 300a against the transfer belt 320.

The upper surface 300a may also be configured as a plurality of ribs 84 having the same general constructions and functions as the plurality of ribs 84 of the first embodiment, similar to the guide member 300' illustrated in FIG. 9.

In the mode illustrated in FIG. 9, the transfer belt 320 is biased by the plurality of ribs 84 abutting upon the inner surface 320a as well as by the biasing portions 340b.

Thus, the portion of the transfer belt 320 located in the image forming area is more reliably biased and moved in the left direction Y. That movement is restricted by the abutment between the right side face 300c of the guide member 300' and the left side face 324a of the right guide portion 324.

Therefore, according to the mode illustrated in FIG. 9, due to the application of such certain bias and restriction, the portion of the transfer belt 220 located in the image forming area is more significantly inhibited from meandering. The positional deviation of the image forming position upon the recording medium 5 is also inhibited preferably.

In the mode illustrated in FIG. 9, the member 340 can be omitted and the transfer belt 320 can receive only the biasing due to the plurality of ribs 84.

(The Forth Embodiment)

In the conveying mechanism of the present embodiment, only the configurations of the transfer roller and the guide member mainly differ from those of the aforementioned first embodiment. Therefore, only the different configurations will be mainly described, while the components with the same configurations are denoted with the same reference numerals and the description of the same is omitted.

Figure 10A:
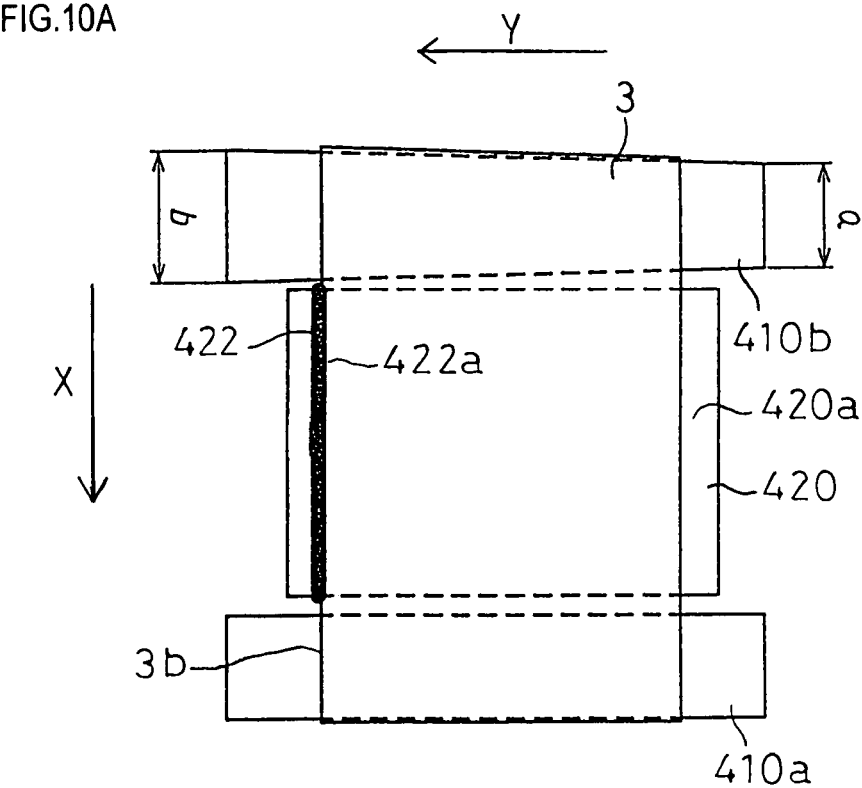
FIG. 10A and FIG. 10B are explanatory views showing the relationships among a transfer belt, transfer rollers and a guide member in conveying mechanisms of other embodiments.

FIG. 10A is an explanatory view showing the relationship among a transfer belt 3, transfer rollers 410a and 410b, and a guide member 420 in the conveying mechanism of the present embodiment.

In the conveying mechanism of the present embodiment, biasing force in the left direction Y is applied to the transfer belt 3 by using the transfer rollers 410a and 410b.

Specifically, the transfer rollers 410a and 410b have the same basic functions as in the first embodiment in that the transfer rollers 410a and 410b actuate the transfer belt 3 by rotating.

However, in the present embodiment, a unilateral transfer roller 410b is gradually enlarged in the shaft diameter toward the left direction Y, and the relationship between the shaft diameter a of the right end portion and the shaft diameter b of the left end portion is set so that a<b. In the transfer rollers 410a and 410b, the shaft directions are set to be parallel.

Comparatively large frictional resistance force and pulling tension act upon the transfer belt 3 wound around the transfer rollers 410a and 410b from the vicinity of the left end of the transfer roller 410b, enlarged in shaft diameter. Comparatively small frictional resistance force and pulling tension act upon the transfer belt 3 from the vicinity of the right end of the transfer roller 410b, reduced in shaft diameter.

In this case, the movement of the transfer belt 3 along the transfer direction X is inhibited in the area located in the left direction Y where a relatively large frictional resistance force and pulling tension act. Because of such inhibition of movement, the transfer belt 3 is biased in the left direction Y where a frictional resistance force and pulling tension is larger, and is gradually moved in the left direction Y.

The guide member 420 of the present embodiment is provided at a position facing the print head 1 (the image forming area) via the transfer belt 3 similar to the guide member 8 of the first embodiment.

The guide member 420 is a plate-like member with a configuration such as a rectangular parallelepiped. A projection piece 422 extending along the transfer direction X is provided in the vicinity of the left end of the upper surface 420a of the guide member 420, facing the transfer belt 3.

The right side face 422a of the projection piece 422 is opposed to the left side face 3b of the portion of the transfer belt 3 located in the image forming area.

In the present embodiment, the transfer belt 3 receives a biasing force in the left direction Y from the transfer rollers 410a and 410b as above. The movement caused by the biasing force is limited and restricted by the abutment between the right side face 422a of the projection piece 422 and the left side face 3b of the portion of the transfer belt 3 located in the image forming area.

Thus, in the present embodiment, the portion of the transfer belt 3 located in the image forming area is restricted in the movement in the width direction, because of the biasing from the transfer rollers 410a and 410b, and the restriction by the abutment between the right side face 422a and the left side face 3b.

Due to the restriction as above, the portion of the transfer belt 3 located in the image forming area is inhibited from meandering when transferred by the transfer rollers 410a and 410b.

As a result, occurrence of positional deviation of the recording medium 5 fed to the image forming area can be suppressed, and positional deviation of the image forming position upon the recording medium 5 is suppressed preferably.

The projection piece 422 corresponds to a restricting projection piece. The right side face 422a of the projection piece 422 corresponds to a restricting guide member side face. And the left side face 3b of the transfer belt 3 corresponds to a restricting belt side face.

In the present embodiment, only the unilateral transfer roller 410b is gradually enlarged in the shaft diameter toward the left direction Y. However, the other transfer roller 410a may be gradually enlarged in the shaft diameter toward the left direction Y as well.

Figure 10B:
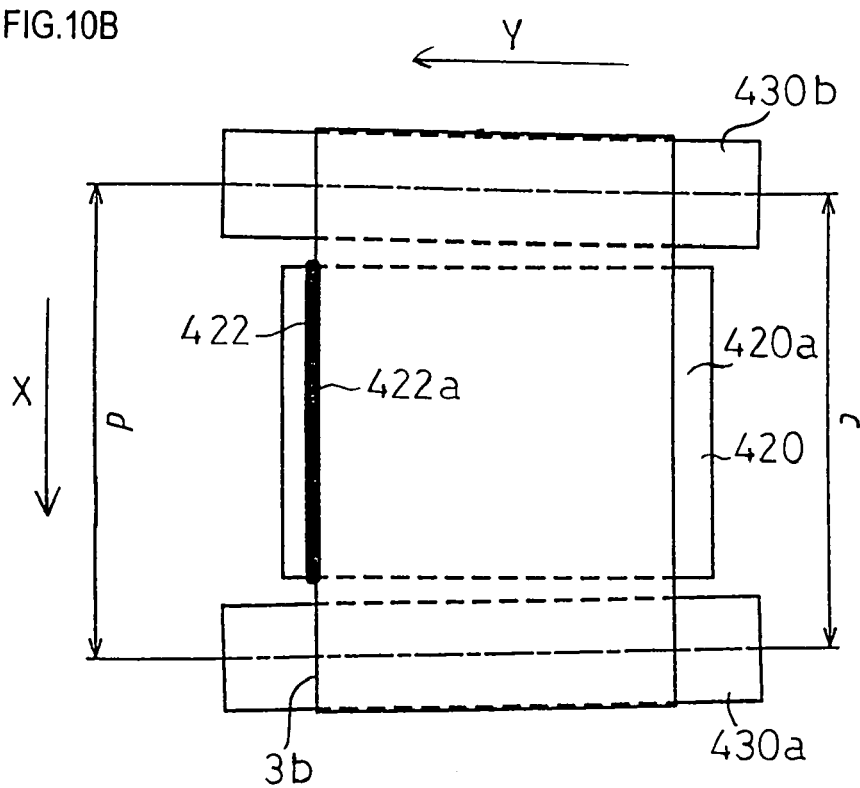

Also, as another configuration in which biasing force in the left direction Y is applied to the transfer belt 3 by the transfer roller, the configuration illustrated in FIG. 10B may be adopted.

In the mode illustrated in FIG. 10B, the shaft directions of the transfer rollers 430a and 430b for transferring the transfer belt 3 are mutually shifted by predetermined angles so as to bias the transfer belt 3 in the left direction Y.

Specifically, if the intervals between the shaft centers of the transfer rollers 430a and 430b at right end and left end are set to be c and d respectively, then c<d.

In this case, the pulling tension in the transfer direction X applied to the left end of the transfer belt 3 is larger than the pulling tension in the transfer direction X applied to the right end of the transfer belt 3. As a result, the transfer belt 3 is biased in the left direction Y and is gradually moved in the left direction Y.

In this case as well, if the guide member 420 configured as in FIG. 10A is provided, the movement of the transfer belt 3 in the left direction Y is limited and restricted by the abutment between the right side face 422a and the left side face 3b.

Therefore, in the mode of FIG. 10B as well, the same effect as above can be obtained. The meandering of the portion of the transfer belt 3 located in the image forming area and the positional deviation of the image forming position on the recording medium 5 are suppressed.

The upper surface 420a of the guide member 420 may be constituted as a smooth surface as illustrated in the aforementioned FIGS. 10A and 10B. In this case, the flatness of the portion of the transfer belt 3 located in the image forming area can be improved by pressing the upper surface 420a against the transfer belt 3.

Also, the upper surface 420a may be configured as a plurality of ribs 84 having the same general configurations and functions as the plurality of ribs 84 of the first embodiment.

In this case, the transfer belt 3 is biased by the plurality of ribs 84 abutting the inner surface of the transfer belt 3 as well as by the transfer rollers 410a and 410b, or 430a and 430b.

Thus, the portion of the transfer belt 3 located in the image forming area is biased more certainly and moved in the left direction Y. That movement is reliably restricted by the abutment between the right side face 422a and the left side face 3b.

Consequently, due to such certain bias and restriction, the portion of the transfer belt 3 located in the image forming area is reliably inhibited from meandering, and the positional deviation of the image forming position on the recording medium 5 is preferably inhibited.

INDUSTRIAL APPLICABILITY

According to the present invention, such a conveying mechanism is provided that the portion of the transfer belt located in the image forming area is preferably inhibited from meandering.

What is claimed is:

1. A conveying mechanism for transferring a recording medium to an image forming area in which an image is formed on the fed recording medium, the conveying mechanism comprising:
   a transfer belt for transferring the recording medium at a position with a predetermined interval with respect to a recording head for forming the image;
   at least two transfer rollers for transferring the transfer belt wound around the transfer rollers;
   a guide member provided between the at least two transfer rollers at a position facing the recording head and separated from all the transfer rollers;
   a biasing device for biasing the transfer belt in one direction which is the width direction of the transfer belt; and
   a restriction device configured by the portions of the transfer belt and the guide member for restricting the movement of the transfer belt biased in the one direction by the biasing device.

2. The conveying mechanism as set forth in claim 1, wherein the biasing device comprises a contact portion of the guide member in contact with the transfer belt on which frictional resistance against the transfer belt is gradually enlarged in the biasing direction.

3. The conveying mechanism as set forth in claim 2, wherein the contact portion is a plurality of convex portions disposed on the surface of the guide member facing the transfer belt so as to extend approximately parallel to the transfer direction of the transfer belt,
   and wherein the intervals between convex portions are constituted to be gradually narrowed in the biasing direction.

4. The conveying mechanism as set forth in claim 1, wherein the transfer belt comprises a biasing belt side face, the biasing belt side face being approximately parallel to the transfer direction of the transfer belt and having a predetermined angle with respect to the belt surface of the transfer belt on which the recording medium is placed,
   wherein the guide member comprises a biasing guide member side face, the biasing guide member side face being disposed at the position facing the biasing belt side face, being approximately parallel to the transfer direction, and having a predetermined angle with respect to the belt surface,
   and wherein the biasing device comprises a biasing member, the biasing member being disposed between the biasing belt side face and the biasing guide member side face so as to set apart the biasing belt side face and the biasing guide member side face.

5. The conveying mechanism as set forth in claim 4, wherein the biasing member is fixed to one of either the biasing belt side face or the biasing guide member side face.

6. The conveying mechanism as set forth in claim 5, wherein a sliding member is provided between the biasing member and the side face opposite to one of either the biasing belt side face or the biasing guide member side face, to which the biasing member is fixed.

7. The conveying mechanism as set forth in claim 6, wherein the biasing member is an elastic member made of metal and the sliding member is a member made of resin.

8. The conveying mechanism as set forth in claim 4, wherein the biasing belt side face is a side face of a biasing projection piece protruding from the surface of the transfer belt opposite to the belt surface on which the recording medium is placed.

9. The conveying mechanism as set forth in claim 4, wherein the biasing guide member side face is a side face of a biasing projection piece protruding from the surface of the guide member facing the transfer belt.

10. The conveying mechanism as set for in claim 1, wherein the restriction device comprises,
    a restricting belt side face provided to the transfer belt, the restricting belt side face being approximately parallel to the transfer direction of the transfer belt and having a predetermined angle with respect to the belt surface of the transfer belt on which the recording medium is placed,
    and a restricting guide member side face provided to the guide member so as to face the restricting belt side face, the restricting guide member side face being approximately parallel to the transfer direction, and having a predetermined angle with respect to the aforementioned belt surface.

11. The conveying mechanism as set forth in claim 10, wherein the restricting belt side face is a side face of a restricting projection piece protruding from the surface of the transfer belt opposite to the belt surface on which the recording medium is placed.

12. The conveying mechanism as set forth in claim 10, wherein the restricting guide member side face is a side face of a restricting projection piece protruding from the surface of the guide member facing the transfer belt.

13. The conveying mechanism as set forth in claim 1, wherein the biasing device comprises the transfer roller gradually enlarged in the shaft diameter in the one direction for biasing the transfer belt.

14. The transfer roller as set forth in claim 1, wherein the biasing device comprises the transfer roller of which the shaft direction is shifted by a predetermined angle with respect to the width direction of the transfer belt so as to bias the transfer belt in one direction which is the width direction of the transfer belt.

* * * * *